Figure 1:
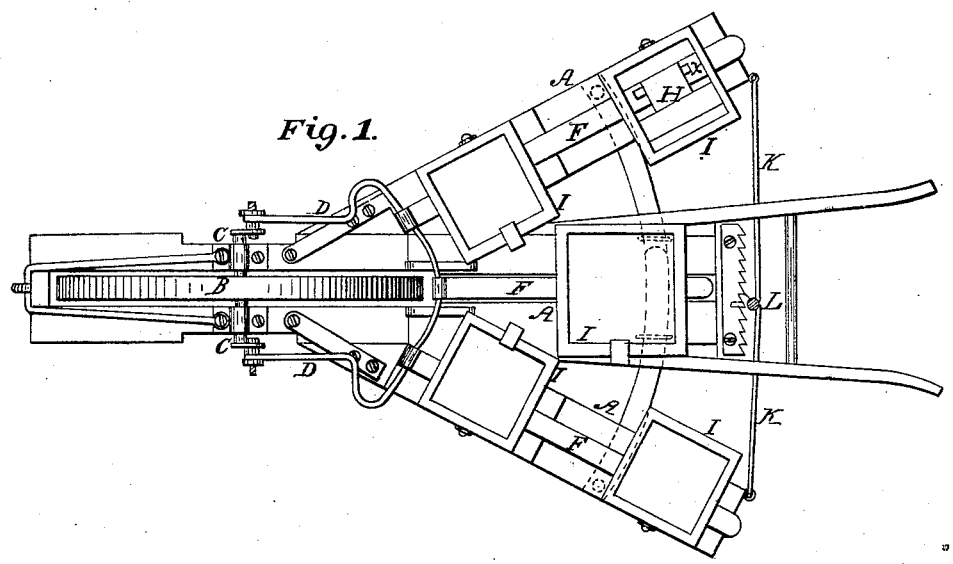
Figure 2:
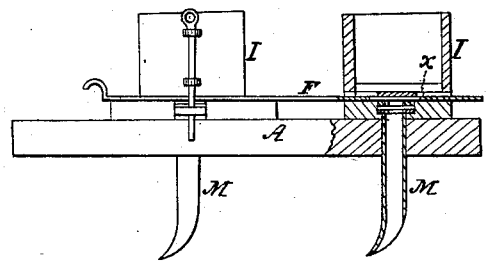

M. L. NICKELS.
Grain Drill.

No. 78,682.

Patented June 9, 1868.

Witnesses:

Inventor:

United States Patent Office.

M. L. NICKELS, OF DUNLAPSVILLE, INDIANA.

Letters Patent No. 78,682, dated June 9, 1868.

IMPROVEMENT IN GRAIN-DRILL.

*The Schedule referred to in these Letters Patent and making part of the same.*

TO ALL WHOM IT MAY CONCERN:

Be it known that I, M. L. NICKELS, of Dunlapsville, in the county of Union, and in the State of Indiana, have invented certain new and useful Improvements in Grain-Drills; and do hereby declare that the following is a full, clear, and exact description thereof, reference being had to the accompanying drawings, and the letters of reference marked thereon.

In the annexed drawings, making a part of this specification, A A represent the parts of a suitable frame, for my improved grain or seed-drill.

The side-pieces are hinged to the centre-piece, in any suitable manner, so as to be moved out and in, as may be desired.

The centre-piece is provided with a slot, in which works the wheel B, upon a suitable shaft therefor. The shaft of the wheel B is provided with cranks, C C, one on each end, as shown, to which is attached the curved bar or pitman D.

F F represent sliding slotted plates, adjusted on top of the frame-pieces A A, and are operated backward and forward by means of the pitman D. The sliding plates F F are each provided with one or more slots $x$, to correspond with and work over the top of and hold in the tooth or plough M.

H represents a plate, placed across the bottom of the hopper I and the slot $x$ of the sliding plate F, as shown.

The hoppers I I are secured to the top of the frame A, over the teeth M and the slots $x$ $x$. Two hoppers or more are secured to the side-pieces, and one to the middle or centre-piece.

A lever, L, is pivoted to the rear end of the centre-piece of the frame, and has rods, K K, extending to and fastened to the side-pieces of the frame A. By moving the lever L backward and forward, the side-pieces may be regulated at any required angle with and distance from the centre-piece of the frame, and thus regulate the distance of the rows of grain apart.

The cranks C C, or the arms thereof, are slotted, so that the crank-pin, and therefore the reach, may be regulated, as may be desired, and the distance the plates F F slide, and thereby the flow of seed or grain through into the drills.

The wheel B, when in motion, operates as a drive-wheel to this machine, and, by means of the cranks C C and pitman D, operates the sliding plates F F.

The seed or grain is put in the hoppers I I, and falls into the ends of the slot $x$, and is drawn under the plate H, and passes out through the hole in the teeth M. The teeth M are provided with a hole through their centres, and are adjusted in the frame A in any of the known or usual ways.

It will be understood that the pivots in the slotted arms C C are easily removed for the purpose of regulating the flow of grain. When the pivots are moved in the slots towards the driving-shaft, the action of the pitman becomes shorter, and thereby decreases the flow of seed in the hoppers, and as the pivots are moved from the shaft the flow is increased.

The slots in the metal slides F are somewhat longer than the width of the stationary plates H, consequently there is a space for the seed to fall in the slots of plates F, on each side of the plate H, before it is carried through the under plate to the flukes. By these devices, it will be seen that the flow of seed through the flukes is always regular.

What I claim, and desire to secure by Letters Patent, is—

The arrangement of the slotted arms C C, pitman D, slides F F, and plates H H, with the frame A, and its hoppers I, when the several parts are constructed and operating substantially as and for the purposes set forth.

In testimony that I claim the foregoing, I have hereunto set my hand, this 5th day of March, 1868.

M. L. NICKELS.

Witnesses:
ALFRED BURK,
R. C. SWANN.